United States Patent [19]

Amano et al.

[11] Patent Number: 4,885,333

[45] Date of Patent: Dec. 5, 1989

[54] POLYVINYL CHLORIDE RESIN COMPOSITION HAVING IMPROVED THERMAL STABILITY AND A METHOD FOR THE PREPARATION THEREOF

[75] Inventors: Tadashi Amano, Ibaraki; Tokuji Abe, Saitama, both of Japan

[73] Assignee: Shin-Etsu Chemical Co., Ltd., Tokyo, Japan

[21] Appl. No.: 172,338

[22] Filed: Mar. 23, 1988

[30] Foreign Application Priority Data

Mar. 23, 1987 [JP] Japan .................................. 62-68654

[51] Int. Cl.$^4$ ........................ C08K 5/06; C08L 27/06
[52] U.S. Cl. .................................... 524/762; 524/377; 524/834
[58] Field of Search ............... 524/366, 377, 762, 834; 525/185

[56] References Cited

U.S. PATENT DOCUMENTS 4,134,868  1/1979  Minagawa ........................... 524/178
4,435,524  3/1984  Dinbergs ........................... 526/344.2

FOREIGN PATENT DOCUMENTS 3341521  5/1985  Fed. Rep. of Germany .

Primary Examiner—Wilbert J. Briggs, Sr.
Assistant Examiner—David Buttner
Attorney, Agent, or Firm—Wenderoth, Lind & Ponack

[57] ABSTRACT

A polyvinyl chloride resin-based composition can be imparted with improved thermal stability of compounding the same with a polygylcerin in an amount of 0.01 to 0.5% by weight based on the resin even when the composition is compounded with a heat stabilizer having relatively low effectiveness although the use of such a heat stabilizer is desirable in respect of the physiological inertness. Similar improving effects on the thermal stability of a polyvinyl chloride resin-based composition can be obtained when the resin is prepared by suspension-polymerizing vinyl chloride monomer in an aqueous medium containing a polyglycerin.

1 Claim, No Drawings

POLYVINYL CHLORIDE RESIN COMPOSITION HAVING IMPROVED THERMAL STABILITY AND A METHOD FOR THE PREPARATION THEREOF

BACKGROUND OF THE INVENTION

The present invention relates to a composition based on a polyvinyl chloride resin, which is referred to as a PVC resin hereinbelow, having improved thermal stability and a method for the preparation thereof. More particularly, the present invention provides a PVC resin composition useful as a molding material imparted with remarkably improved thermal stability even when the heat stabilizer compounded therein has relatively low effectiveness such as those having no toxicity against the human body.

When a PVC resin-based composition is used as a molding material of various articles used in contact with foods or used in medical applications, it is essential that the heat stabilizer compounded therein has no toxicity against the human body such as the calcium-zinc based ones and barium-zinc based ones. The effectiveness of these non-toxic heat stabilizers is, however, rather low so that the shaped articles of the molding composition compounded with such a non-toxic heat stabilizer sometimes cause troubles in respect of the initial coloring after molding and thermal degradation during use. As a measure to solve this problem, it is practiced that the PVC resin-based composition is further admixed with an antioxidant or a compound having one or more hydroxy groups such as glycerin, pentaerithritol, sorbitan fatty acid esters, sugar esters and the like. These prior art methods are not quite effective in respect of the improvement of thermal stability or, rather, the addition of such additives may cause an adverse influence on the thermal stability of PVC resin-based compositions to increase the initial coloration when the heat stabilizer compounded therein is a tin-based or lead-based one.

SUMMARY OF THE INVENTION

The present invention accordingly has an object to provide a novel PVC resin-based composition imparted with greatly improved thermal stability without affecting other properties of the composition even when the heat stabilizer compounded therein is a relatively ineffective calcium-zinc based or barium-zinc based one having no toxicity against the human body.

Thus, the polyvinyl chloride-based resin composition of the present invention comprises, in admixture:

(a) a polyvinyl chloride-based resin; and (b) a polyglycerin in an amount in the range from 0.01 to 0.5 parts by weight per 100 parts by weight of the polyvinyl chloride-based resin.

Such a PVC resin-based composition can be obtained, of course, by compounding a PVC resin with the polyglycerin in the above specified amount either together with or separately from other additives. Alternatively, an equally effective PVC resin-based composition can be obtained by conducting the suspension polymerization of vinyl chloride monomer in an aqueous polymerization medium containing a polyglycerin in an appropriate amount.

DETAILED DESCRIPTION OF THE PREFERRED EMBODIMENTS

The polyglycerin, which is the additive to the PVC resin in the present invention, is a compound represented by the general formula $$HO-CH_2-CHOH-CH_2-O-(-CH_2-CHOH-CH_2-O-)_n-CH_2-CHOH-CH_2OH,$$

in which the subscript n is a positive integer. It is preferable in the invention to use a polyglycerin expressed by the above given general formula in which n has a value of 2 to 8. The amount of the polyglycerin added to the PVC resin is in the range from 0.01 to 0.5% by weight based on the resin. When the amount thereof is too small, no noticeable improvement can be obtained in the thermal stability of the PVC resin-based composition. When the amount thereof is increased to exceed the above mentioned upper limit, no further improvement can be obtained in the thermal stability of the resin composition or, rather, some adverse influences are caused on the thermal stability of a resin composition containing a tin-based heat stabilizer in respect of the initial coloring after molding if not to mention the economical disadvantage due to the increased cost for the additive.

The manner in which the polyglycerin is added to the PVC resin is not particularly limitative provided that the amount of the polyglycerin in the resultant resin composition is in the above mentioned range. For example, the polyglycerin may be added to the aqueous polymerization medium, in which vinyl chloride monomer or a monomer mixture mainly composed of vinyl chloride is suspension-polymerized, either before the start of the polymerization reaction or during or after completion of the polymerization reaction. Further, the polyglycerin can be added to a wet cake of the polymerizate after centrifugal dehydration of the slurry or to the PVC resin in a powdery form as dried, if necessary, together with other additives. The polyglycerin is added in the form of a solution as dissolved in a suitable solvent according to need.

The procedure for the suspension polymerization of vinyl chloride monomer or a monomer mixture mainly composed of vinyl chloride may be conventional and need not be described here in detail. The above mentioned monomer mixture is composed of, for example, at least 50% by weight of vinyl chloride monomer and the balance of one or more of other monomers copolymerizable with vinyl chloride. The comonomers copolymerizable with vinyl chloride include vinyl esters, e.g., vinyl acetate and vinyl propionate, esters of acrylic or methacrylic acid, e.g., methyl acrylate and ethyl acrylate, olefins, e.g., ethylene and propylene, maleic anhydride, acrylonitrile, styrene, vinylidene chloride and the like.

The dispersion aid which is added to the aqueous polymerization medium can be any known ones conventionally used in the suspension polymerization of vinyl chloride monomer including water-soluble polymers exemplified by water-soluble cellulose ethers, e.g., methyl cellulose, hydroxyethyl cellulose, hydroxypropyl cellulose and hydroxypropyl methyl cellulose, partially saponified polyvinyl alcohol, polymers of acrylic acid, gelatin and the like, oil-soluble surface active agents, e.g., sorbitan monolaurate, sorbitan trioleate, glycerin tristearate, block copolymers of ethylene oxide and propylene oxide and the like, and water-soluble surface active agents, e.g., polyoxyethylene sorbitan monolaurate, polyoxyethylene glycerin oleate, sodium laurate and the like. These dispersion aids can be used either singly or as a combination of two kinds or more according to need.

The polymerization initiator used in the suspension polymerization of the monomer or monomers can be selected from those conventionally used in the prior art including percarbonate compounds, e.g., diisopropyl peroxy dicarbonate, di-2-ethylhexyl peroxy dicarbonate, diethoxyethyl peroxy dicarbonate and the like, perester compounds, e.g., tert-butyl peroxy pivalate, tert-butyl peroxy neodecanoate, α-cumyl peroxy neodecanoate and the like, organic peroxides, e.g., acetyl cyclohexyl sulfonyl peroxide, 2,4,4-trimethylpentyl-2-peroxy phenoxy acetate, 3,5,5-trimethyl hexanoyl peroxide and the like and azo compounds, e.g., azobis-2,4-dimethyl valeronitrile, azobis(4-methoxy-2,4-dimethyl valeronitrile and the like as well as inorganic peroxides, e.g., potassium persulfate, ammonium persulfate, hydrogen peroxide and the like, and so on. These polymerization initiators can be used either singly or as a combination of two kinds or more according to need.

It is of course optional that the polymerization mixture is admixed with various kinds of other additives conventionally used in the suspension polymerization of vinyl chloride including chain transfer agents, pH controlling agents, gelation improvers, antistatic agents, antioxidants, scale deposition reducing agents and the like according to need.

It should be noted that, when the polyglycerin is added to the aqueous polymerization medium, not all of the amount thereof can be taken into the PVC resin produced by the suspension polymerization. Namely, a considerable portion of the polyglycerin added to the aqueous medium remains in the aqueous medium by not being taken into the PVC resin because of the water-solubility of polyglycerins. Accordingly, the amount of the polyglycerin added to the aqueous polymerization medium should be large enough so that the resultant PVC resin may contain from 0.01 to 0.5 parts by weight of the polyglycerin per 100 parts by weight of the PVC resin. The necessary amount of the polyglycerin to be added to the aqueous medium can be easily determined by undertaking several preliminary test polymerization runs in which the amount of the polyglycerin remaining in the aqueous medium after completion of the polymerization is determined by analysis to estimate the amount thereof taken into the resin.

In the following, the method of the present invention is described in more detail by way of examples.

EXAMPLES 1 TO 3

Into a stainless steel-made autoclave of 2000 liter capacity equipped with a stirrer and provided with a jacket for heating and cooling media were introduced 900 kg of deionized water, 300 g of a partially saponified polyvinyl alcohol and 176 g of azobis-2,4-dimethyl valeronitrile and the autoclave was evacuated to have a pressure of 50 mmHg followed by introduction of 600 kg of vinyl chloride monomer. With the stirrer of the autoclave being driven, hot water was passed through the jacket of the autoclave to heat the mixture therein up to 64° C. so that the polymerization reaction was started and continued at the same temperature until the pressure inside the autoclave had dropped to 8.0 kg/cm²G. After discharge of the unreacted monomer to be recovered, the polymerizate slurry in the autoclave was admixed with 1000 g of a polyglycerin and taken out of the autoclave followed by dehydration and drying in a conventional manner to give a PVC resin product. The polyglycerins used in Examples 1, 2 and 3 each had a degree of polymerization corresponding to the value of n in the general formula

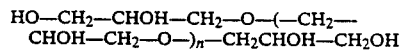

equal to 4, 6 and 8, respectively. The resin products obtained in Examples 1, 2 and 3 are referred to as the PVC-1, PVC-2 and PVC-3, respectively, hereinbelow.

EXAMPLE 4

The procedure of the suspension polymerization of vinyl chloride monomer was substantially the same as in the preceding examples except that the polymerization mixture before the start of the polymerization reaction was admixed with 1000 g of the same polyglycerin as used in Example 2 instead of adding the same to the polymerizate slurry after completion of the polymerization reaction. The thus obtained resin product is referred to as the PVC-4 hereinbelow.

COMPARATIVE EXAMPLE 1

The procedure of the suspension polymerization of vinyl chloride monomer was substantially the same as in the Examples 1 to 3 except that no polyglycerin was added to the polymerizate slurry after completion of the polymerization reaction. The thus obtained resin product is referred to as the PVC-5 hereinbelow.

COMPARATIVE EXAMPLE 2

The procedure of the suspension polymerization of vinyl chloride monomer was substantially the same as in Examples 1 to 3 except that the polyglycerin added to the polymerizate slurry after completion of the polymerization reaction was replaced with the amount of sorbitan monolaurate. The thus obtained resin product is referred to as the PVC-6 hereinbelow.

COMPARATIVE EXAMPLE 3

The procedure of the suspension polymerization of vinyl chloride monomer was substantially the same as in the Examples 1 to 3 except that the polyglycerin added to the polymerizate slurry after completion of the polymerization reaction was replaced with 900 g of saccharose monostearate. The thus obtained resin product is referred to as the PVC-7 hereinbelow.

Evaluation tests of the PVC resins for thermal stability.

Thermal stability test I.

Each 100 parts by weight of the PVC resins PVC-1 to PVC-7 prepared above were admixed with 8 parts by weight of an impact strength improver (B-22, a product by Kaneka Co.), 6 parts by weight of an epoxidated soybean oil, 0.1 part by weight of calcium stearate, 0.3 part by weight of zinc stearate and 0.2 part by weight of a lubricant (Hoechst Wax PE-190) and the mixture was kneaded on a test roll mill at 180° C. for 5 minutes and shaped into a sheet having a thickness of 0.5 mm. The thus prepared sheets were kept in a Geer oven running at 170° C. to determine the length of time in minutes taken for complete blackening of the sheet as an index value of the thermal stability. The results are shown in the table given below.

Thermal stability test II.

Each 100 parts by weight of the PVC resins PVC-1 to PVC-7 prepared above were admixed with 7 parts by weight of an impact strength improver (C-202, a product by Mitsubishi Rayon Co.), 1.5 parts by weight of a first processing aid (P-501, a product by Mitsubishi Rayon Co.), 0.5 part by weight of a second processing aid (P-700, a product by Mitsubishi Rayon Co.), 1.0 part by weight of glycerin monostearate, 1.8 parts by weight of octyl tin mercaptide (Mark-467, a product by Adeka Co.) and 0.2 part by weight of a lubricant (AC-316A, a product by Allied Chemical Co.) and the mixture was kneaded on a test roll mill at 160° C. for 5 minutes and shaped into a sheet having a thickness of 0.5 mm. The thus prepared sheets were kept in a Geer oven running at 190° C. to determine the length of time in minutes taken for complete blackening of the sheet as an index value of the thermal stability. The results are shown in the table given below.

Initial coloring test.

The sheets having a thickness of 0.5 mm prepared in the thermal stability test II described above were each further pressed in a hot press at 160° C. for 10 minutes to give a transparent test specimen. The coloration of the test specimens was compared visually taking the specimen prepared from PVC-5 as the reference. The coloration of the test specimens prepared from PVC-1 to PVC-4 was substantially the same as the reference while the specimen prepared from PVC-6 was somewhat yellowish and the specimen prepared from PVC-7 was somewhat reddish as compared with the reference.

TABLE

| PVC No. | Thermal stability I, minutes | Thermal stability II, minutes |
|---|---|---|
| 1 | 120 | 100 |
| 2 | 120 | 100 |
| 3 | 120 | 100 |
| 4 | 120 | 100 |
| 5 | 70 | 100 |
| 6 | 90 | 80 |
| 7 | 100 | 80 |

What is claimed is:

1. A method for the preparation of a polyvinyl chloride resin-based composition having improved thermal stability which comprises suspension-polymerizing vinyl chloride monomer or a monomer mixture mainly composed of vinyl chloride in an aqueous polymerization medium containing a polyglycerin represented by the general formula $$HO-CH_2-CHOH-CH_2-O-(-CH_2-CHOH-CH_2-O-)_n-CH_2-CHOH-CH_2OH,$$

in which the subscript n is a positive integer from 2 to 8, in such an amount that the polyvinyl chloride resin produced by the suspension polymerization contains the polyglycerin in an amount in the range from 0.01 to 0.5 part by weight per 100 parts by weight of the polyvinyl chloride resin.

* * * * *